United States Patent [19]
Gounder

[11] Patent Number: 5,181,381
[45] Date of Patent: Jan. 26, 1993

[54] POWER PLANT WITH DUAL PRESSURE REHEAT SYSTEM FOR PROCESS STEAM SUPPLY FLEXIBILITY

[75] Inventor: Ponnusami K. Gounder, San Diego, Calif.

[73] Assignee: Ahlstrom Pyropower Corporation, San Diego, Calif.

[21] Appl. No.: 910,010

[22] Filed: Jul. 8, 1992

[51] Int. Cl.$^5$ ............................................. F01K 13/02
[52] U.S. Cl. ...................................... 60/648; 60/676; 60/679
[58] Field of Search .......................... 60/648, 676, 679

[56] References Cited

U.S. PATENT DOCUMENTS

| | | | |
|---|---|---|---|
| 3,391,539 | 7/1968 | Dimitroff, Jr. et al. | 60/648 X |
| 4,042,809 | 8/1977 | Shetler | 60/648 X |
| 4,060,990 | 12/1977 | Guido et al. | 60/676 |

*Primary Examiner*—Allen M. Ostrager
*Attorney, Agent, or Firm*—Baker, Maxham, Jester & Meador

[57] ABSTRACT

A power plant having multiple steam boilers for supplying steam for processing and for powering a turbine generator comprises a steam turbine having first and second stages, a steam powered processing unit, a plurality of steam boilers, each having a primary steam generator and a reheater, a system of steam lines for conducting primary steam from the steam boilers to said turbine, and to the process unit, return lines for returning cold steam from the first stage of the turbine to the reheaters for reheating, and lines for conducting reheated steam from the reheaters to the second stage of the turbine; and isolating valves in the lines with pressure relief valves on each side of the isolating valves for selectively isolating each of the boilers from the turbine and conducting primary steam through the reheaters of the boiler and to the processing unit.

18 Claims, 1 Drawing Sheet

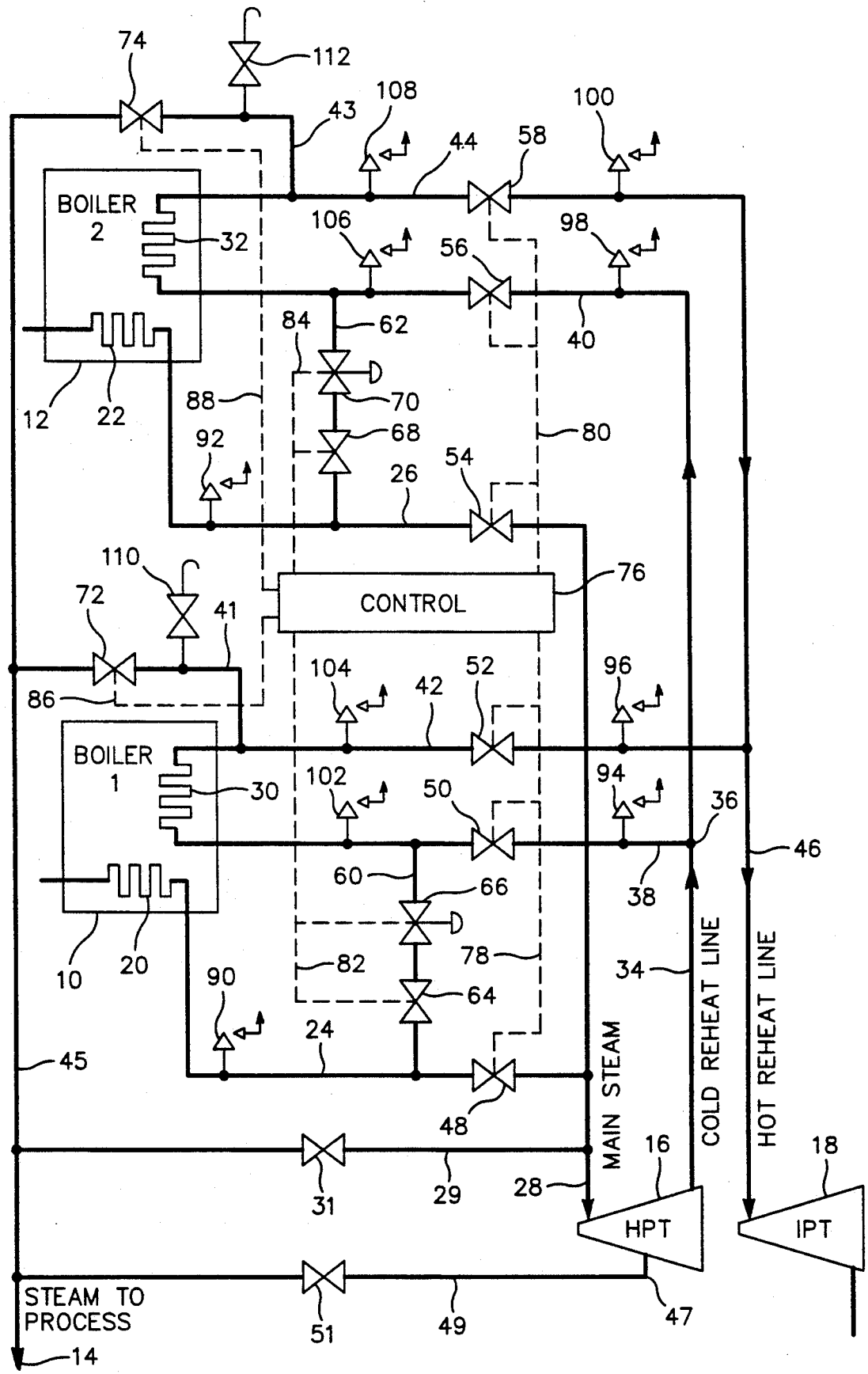

POWER PLANT WITH DUAL PRESSURE REHEAT SYSTEM FOR PROCESS STEAM SUPPLY FLEXIBILITY

BACKGROUND OF THE INVENTION

The present invention relates to power plants and pertains particularly to multi-boiler co-generating plants with a steam turbine generator and process steam requirements with flexible control of reheat steam and process steam supply.

Many manufacturing and processing plants require a source of steam to carry out many of the processes. For this reason most factories and processing plants have their own steam generating plants. For economic reasons many of the steam generating plants are designed and built as co-generating plants supplying steam for processing and for powering turbines for generating electrical power.

Co-generation power plants wherein boilers supply steam for processing as well as to turbines for generation of electrical power are widely used in industry today. It is common for such systems to be called on to supply widely varying demands for process steam and turbine power steam. Many times the temperatures and pressures for the process steam and the turbine generator steam are different. In some cases, when high volumes of process steam is required, boilers are designed for supplying process steam only. However, where the power plant has multiple boilers supplying the steam to the turbine generator, a continuous uninterruptable supply of process steam can normally be maintained.

Many factors enter into the economical construction and operation of a power plant. For example, fuel efficiency increases with higher pressures and temperatures. However, plant construction and operating costs generally increase rapidly with increases in pressures and/or temperatures. Higher pressures and temperatures require expensive heavier and higher strength materials.

Where process steam requirements are high, and when the steam is off-line, reheater protection under high boiler firing conditions becomes a major problem. However, this can sometimes be remedied with a high pressure (HP) turbine bypass system. Also where the process steam pressure requirement is less than the reheat system pressure, the main steam bypassed through the reheater can meet the process steam requirement.

If the process steam supply pressure is greater than the reheater design pressure, process steam can be supplied from the main steam line. Then, reheater protection becomes a problem because there in no cooling flow through the reheater.

Accordingly there is a need for an arrangement and interconnection of the boilers, turbines, reheaters and process steam supply that enables flexible operation and protects the reheater where different pressures are required.

SUMMARY AND OBJECTS OF THE INVENTION

It is the primary object of the present invention to provide an improved multi-boiler co-generating systems.

In accordance with a primary aspect of the present invention a power plant having multiple boilers supplying steam to a single turbine and to a process station includes a system of steam lines and valves that enable isolation of either or both boilers from the turbine and bypassing primary steam through the reheater to the process station.

BRIEF DESCRIPTION OF THE DRAWING

The above and other objects and advantages of the present invention will become apparent from the following description when read in conjunction with the accompanying drawings wherein:

The drawing is a schematic diagram illustrating a two boiler system embodying the present invention connected for supplying steam to process and a single turbine.

DETAILED DESCRIPTION OF A PREFERRED EMBODIMENT

Referring to the drawing, there is illustrated a co-generation power plant embodying an exemplary embodiment of the present invention. The power plant comprises multiple boilers in the form of a first boiler 10 and a second boiler 12 for generating steam supplied to a process at 14 and a turbine having a high pressure turbine 16 and intermediate pressure turbine 18. Each of the boilers 10 and 12 have a main or primary steam generator 20 and 22 supplying primary steam by way of lines 24 and 26 to join a main steam line 28 to the input of the high pressure stage or turbine 16. Each of the boilers also have a reheater 30 and 32 for receiving cold return steam via a main return line 34 from the high pressure turbine, which splits at 36 to return lines 38 and 40 to the respective reheaters 30 and 32. The output from the reheaters 30 and 32 is supplied by way of reheat steam lines 42 and 44 to a common line 46 to the intermediate pressure turbine 18.

Steam is supplied to the process during normal operation of the turbine, from a turbine extraction 47 via line 49 or from the main steam line via line 29 and valve 31. A valve 51 controls steam via line 49. A system may have either one or both of these options built in. The steam for processing may require from about five percent (5%) to about twenty percent (20%) of the steam generated. When the turbine is down for maintenance, the process steam is supplied from one or both of the boilers from the reheat supply line by way of lines 41 and 43, which tap off from respective lines 42 and 44 to a line 45 to the process 14. Vent valve 110 and 112 are provided for venting lines 41 and 43 when process steam supply is initiated through these lines.

Each of the boiler primary steam supply lines 24 and 26 and return steam lines connected to the turbine are provided with isolation valves for separately isolating each of the boilers from the turbines. The first boiler 10 is provided with isolation valves 48, 50 and 52 in the lines 24, 38 and 42, respectively for isolating the boiler from the turbine 16, 18. The boiler 12 is similarly provided with isolation valves 54, 56 and 58 in its lines 26, 40 and 44, respectively for isolating it from the turbine 16, 18. These isolation valves give the flexibility of operating the turbine with either one of the boilers and to shut it down while continuing to supply process steam.

Each of the boilers 10 and 12 include a bypass line 60 and 62, respectively, extending between the respective main steam supply lines 24 and 26 to the return steam lines 38 and 40, respectively. The bypass line 60 of the first boiler system includes an isolation valve 64 for isolation and a pressure reducing valve 66 for controlling the bypass there between. Similarly, the bypass line 62 includes bypass isolation valve 68 for isolation and pressure reducing valve 70 to control the bypass of steam between the respective lines 26 and 40. The process team supply lines of each of the boilers are provided with isolation valves 72 and 74, respectively.

The system may be controlled by any suitable means such as a control system having central control unit 76, which may include programmable as well as manual control of the system. The control system including control unit 76 is connected to the respective valves such as by electrical wires or conductors and includes conventional means such as solenoids for controlling the respective valves for controlling the system in accordance with the selected conditions as they may develop.

The control unit 76 is connected to isolation valves 48, 50 and 52 by means of a control conductor 78. The control unit is similarly connected to the isolation valves 54, 56 and 58 for the boiler 12 by means of a conductor 80. A conductor 82 connects the control unit to bypass valves 64 and 66 of the boiler system 10. Similarly, a conductor 84 connects the control unit 76 to the bypass valves 68 and 70 of the second boiler system. Process steam valves 72 and 74 are similarly connected to the control unit 76 by means of conductors 86 and 88.

The main or primary steam lines 24 and 26 are provided with safety or pressure relief valves 90 and 92. The cold reheat line 38 and reheat supply line 42 are also provided with safety or pressure relief valves 94 and 96. Similarly the lines 40 and 44 of the second boiler 12 are provided with safety valves 98 and 100. These reheat line valves are effective during operation of the turbine and are set at lower pressures to take care of normal turbine operating conditions. A second set of safety valves 102 and 104 in lines 38 and 42 and safety valves 106 and 108 in lines 40 and 44 are set at higher pressures to take care of process steam supply conditions. These safety valves are effective when the respective boilers are isolated from the turbine, e.g., by the isolation valves.

This system is primarily designed for operations where the process steam supply pressure is higher than the maximum expected cold reheat steam pressure when the turbine is in operation. The advantage of this system is that the components of the reheat system can be economically designed where the process steam pressure is higher than the reheat steam pressure, and the process steam temperature is lower than the hot reheat steam temperature. For example, the reheat steam for the turbine is preferably at about 600 psig and 1000 degrees Fahrenheit. The process steam is typically about 700 psig and 750 degrees Fahrenheit.

The system provides great flexibility in operation of the system under varying conditions. Under normal conditions, for example the system operates with the two boilers 10 and 12 supplying steam to the turbine 16, 18. The main steam from both boilers is combined into a single stream and taken to the turbine 16. The cold reheat steam from the turbine is divided into two streams at 36 and taken back through the separate boilers 10 and 12 for reheating at 30 and 32 and returned to the turbine 18 for further expansion. During this normal operation of the turbine, the process steam 14 will be supplied from a turbine extraction 47 or from the combined main steam line 28 at line 29.

When the turbine is down for maintenance, the isolation valves 48, 50, 52, 54, 56 and 58 will be closed and process steam will be supplied either by way of the bypass control valve 66 or the bypass control valve 70 through the respective reheater to the process steam supply lines 48 or 50. The process steam may be supplied by both boilers if desired.

This system can be utilized where the process steam supply pressure is higher than the maximum expected cold reheated steam pressure when the turbine is in operation. The components of the reheat system can be economically designed where the process steam pressure is higher than the reheat steam pressure, and the process steam temperature is lower than the hot reheat steam temperature. Thus, a flexible operating system is provided.

Other modifications and changes are possible in the foregoing disclosure and in some instances, some features may be employed without the corresponding use of other features. Accordingly, while the present invention has been illustrated and described with respect to specific embodiments, it is to be understood that numerous changes and modifications may be made therein without departing from the spirit and scope of the invention as defined in the appended claims.

We claim:

1. A power plant having multiple steam boilers for supplying steam for processing and for powering a turbine generator comprising, in combination:
    a steam turbine having at least first and second stages;
    a steam powered processing unit;
    a plurality of steam boilers, each having a primary steam generating means and a reheating means;
    means for selectively conducting primary steam from said steam boilers to said turbine, and to said process station, return means for returning cold steam from said first stage of said turbine to said reheaters for reheating, and means for conducting reheated steam from said reheating means to a second stage of said turbine;
    means for isolating at least one of said boilers from said turbine; and,
    means for conducting primary steam through the reheating means of said boiler and to said processing unit.

2. A power plant according to claim 1 wherein said means for conducting steam comprises a system of steam supply lines including valve means for selectively isolating each of said boilers from said turbine.

3. A power plant according to claim 2 wherein said means for conducting steam from said power plants to said process station includes means for conducting said steam from a selected one of said steam boilers.

4. A power plant according to claim 3 wherein said means for conducting steam comprises bypass means for selectively bypassing said primary steam to said returns means for passing through said reheater, and said means for conducting steam to said process station includes means for conducting said steam from a selected one of said reheaters.

5. A power plant according to claim 1 wherein said means for conducting steam to said process station includes means for conducting said steam from a selected one of said power plants.

6. A power plant according to claim 1 wherein said means for conducting steam comprises bypass means for selectively conducting said primary steam to said returns means for combining with said cold steam, and said means for conducting steam from said steam boilers to said process station includes means for conducting said steam from a selected one of said reheated steam.

7. A power plant according to claim 6 wherein said means for conducting steam comprises valve means for selectively isolating said boilers from said turbine.

8. A power plant according to claim 1 wherein:
said plurality of steam boilers comprises first and second boilers, each boiler having a primary steam generating means and a reheating means;
said means for conducting said steam from said steam boilers to said turbine, and to said process station comprises a system of steam supply lines including primary steam supply lines for conducting said primary steam to said first stage of said turbine, return lines for returning cold steam from said first stage of said turbine to said reheaters for reheating, and reheated steam lines for conducting said reheated steam from said reheater to said second stage of said turbine, and bypass means for bypassing primary steam to said return lines for conducting said primary steam through said reheater, and said means for conducting steam to said process station includes means for conducting said steam from a selected one of said reheaters.

9. A power plant according to claim 8 wherein said means for isolating comprises isolating valve means in each of said lines for selectively isolating each of said boilers from said turbine.

10. A power plant according to claim 9 further comprising a pressure relief valve on each side of said isolating valve means in each of said lines.

11. A power plant having multiple steam boilers supplying steam for processing and for a turbine generator, comprising in combination:
a plurality of boilers, each having a primary steam generator and a reheater;
a steam turbine having first and second stages;
a processing station powered by a quantity of process steam;
a system of steam supply lines for conducting primary steam from said steam boilers to said turbine and to said process station, return lines for returning cold steam from said first stage of said turbine to said reheaters;
isolating valve means for isolating each of said boilers from said turbine;
a pressure relief valve on each side of said isolating valve means in each of said lines; and
bypass means for selectively bypassing a portion of said primary steam through said reheater to said process station.

12. A power plant according to claim 10 wherein said bypass means comprises a bypass line, an isolation valve in said bypass line for isolating said steam supply lines from said return lines, and a pressure reducing valve for controlling a flow of primary steam through said bypass line to said return line.

13. In a power plant having a plurality of steam boilers for supplying steam to a turbine and a processing station, the combination comprising:
a first steam boiler having a primary steam generator and a reheater;
a second steam boiler having a primary steam generator and a reheater;
a steam turbine having a first stage and a second stage;
a processing station for receiving a quantity of process steam steam; and
a system of steam supply lines including primary steam lines for conducting primary steam from said primary steam generators to said turbine, process steam lines for conducting primary steam to said process station, return lines for returning cold steam from said first stage of said turbine to said reheaters, reheat supply lines for conducting reheated steam to said second stage of said turbine, isolating means for isolating said boilers from said turbine, bypass means for selectively conducting a portion of said primary steam to said return lines for passing through said reheaters when said boilers are isolated from said turbine, and means for conducting said steam from said reheater to said process station.

14. A power plant according to claim 13 wherein said isolating means comprises isolating valve means in each of said primary steam supply lines, said return lines and said reheat steam supply lines for selectively isolating said boilers from said turbine, first pressure relief valve means on said turbine side of said isolating valve means, and second pressure relief valve means on said boiler side of said isolating valve means.

15. A power plant according to claim 14 wherein said bypass means comprises a bypass line having an isolation valve for isolating said primary steam line from said return line, and a control valve for controlling the communication of primary steam via said bypass line to said return line.

16. A power plant according to claim 15 wherein said first pressure relief valve means and second pressure relief valve means are at different pressures.

17. A power plant according to claim 16 wherein said isolating means includes remote control means for actuating said valve means.

18. A power plant according to claim 11 wherein said isolating means includes remote control means for actuating said valve means.

* * * * *